(12) United States Patent
Karino et al.

(10) Patent No.: US 6,744,840 B2
(45) Date of Patent: Jun. 1, 2004

(54) INCORE MONITORING METHOD AND INCORE MONITORING EQUIPMENT

(75) Inventors: Yoshiji Karino, Kanagawa-ken (JP); Jun Hamada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/256,232

(22) Filed: Sep. 27, 2002

(65) Prior Publication Data

US 2003/0128793 A1 Jul. 10, 2003

(30) Foreign Application Priority Data

Sep. 27, 2001 (JP) ..................................... 2000-296171

(51) Int. Cl.⁷ .............................................. G21C 17/00
(52) U.S. Cl. ........................ 376/254; 376/255; 376/245
(58) Field of Search ........................... 376/245, 254–255

(56) References Cited

U.S. PATENT DOCUMENTS

| | | | | |
|---|---|---|---|---|
| 4,774,049 A | * | 9/1988 | Impink et al. | 376/245 |
| 4,774,050 A | * | 9/1988 | Impink, Jr. | 376/245 |
| 5,091,139 A | | 2/1992 | Chao et al. | |
| 5,251,242 A | * | 10/1993 | Impink et al. | 376/254 |
| 5,309,485 A | * | 5/1994 | Chao | 376/215 |
| 6,236,698 B1 | * | 5/2001 | Hirukawa et al. | 376/255 |
| 6,310,929 B1 | * | 10/2001 | Hirukawa | 376/245 |
| 6,408,041 B2 | * | 6/2002 | Hirukawa | 376/254 |
| 6,477,219 B2 | * | 11/2002 | Hirukawa et al. | 376/255 |
| 2002/0154724 A1 | * | 10/2002 | Fukasawa | 376/216 |

FOREIGN PATENT DOCUMENTS

| | | |
|---|---|---|
| JP | 56-84592 | 7/1981 |
| JP | 5-134080 | 5/1993 |

* cited by examiner

*Primary Examiner*—Michael J. Carone
*Assistant Examiner*—Daniel Matz
(74) *Attorney, Agent, or Firm*—Foley & Lardner LLP

(57) ABSTRACT

An incore monitoring method of a nuclear reactor, includes, measuring neutron flux levels at pitch levels corresponding to local power range monitor sensors arranged along an axial direction inside a detector assembly installed in a nuclear reactor; performing power calculation, including calculation of thermal characteristics, of fuel assembly group consisting of fuel assemblies adjacent to the corresponding detector assembly, based on indicated values of the local power range monitor sensors of the corresponding detector assembly at a first time, calculating thermal characteristics at a second, subsequent time in which the power calculation is not calculated, based on values indicated by the local power range monitor sensors and calculated thermal characteristics at the first time and values indicated by the corresponding local power range monitor sensors at the second time, and monitoring the calculated thermal characteristics.

13 Claims, 12 Drawing Sheets

CORE STATUS 1
55% POWER,
65% FLOW RATE

CORE STATUS 2
68% POWER,
65% FLOW RATE

CORE STATUS 3
68% POWER,
65% FLOW RATE

CORE STATUS 4
67.5% POWER,
65% FLOW RATE

CORE STATUS 5
67% POWER,
65% FLOW RATE

CORE STATUS 6
66% POWER,
65% FLOW RATE

CORE STATUS 7
70% POWER,
65% FLOW RATE

CORE STATUS 8
82% POWER,
65% FLOW RATE

CORE STATUS 9
90% POWER,
76% FLOW RATE

FIG. 8J  0 : ALL INSERTED
200 (BLANK) : ALL EXTRACTED

INCORE MONITORING METHOD AND INCORE MONITORING EQUIPMENT

CROSS-REFERENCE TO RELATED APPLICATIONS

This application is based upon and claims the benefit of priority from the prior Japanese Patent Application No. 2001-296171 filed on Sep. 27, 2001, the entire contents of which are incorporated herein by reference.

BACKGROUND OF THE INVENTION

1. Field of the Invention

This invention relates to an incore monitoring method and incore monitoring equipment for calculating thermal characteristics of a nuclear reactor continuously, effectively and accurately, and thereby control of a reactor core flow rate, and operation of control rods can be performed adequately based on the calculation result of the thermal characteristics.

2. Description of the Related Art

In adjusting control rod patterns of a boiling water reactor in case of starting-up of the reactor or adjusting reactivity of a reactor core, adjustment is made as a reactor core flow is increased or decreased, and control rods are pulled out or inserted. Since thermal characteristics of a nuclear reactor, such as a maximum linear heat generation rate (MLHGR) or a minimum critical power ratio (MCPR), change every moment in the operation, the operation must be carried out as confirming an output distribution of the thermal characteristics calculated at fixed time intervals or in respect to request from an operator satisfying a condition of an operation limit.

FIG. 14 shows a conventional method of adjusting control rod patterns. That is, in this process, from the start of operation, control rod operation, reactor core flow rate operation, stop of the operation of the control rods and a reactor core flow rate, calculation of power distribution and check of the thermal characteristics are performed in sequence and repeatedly if necessary, and the output is compared with a target output.

In the calculation of the output distribution, thermal characteristics of each fuel assembly composed of the reactor core is calculated based on a nuclear instrumentation system which monitors the neutron flux in a nuclear reactor and the actual measurement of plant data such as the nuclear reactor pressure, the control rod patterns and the reactor core flow rate. The calculation is done by means of a three-dimensional reactor core simulator which combines nuclear calculations for calculating the behavior of neutrons and thermo-hydraulics calculations for calculating the flow distribution inside a reactor core and the void fraction distribution. Consequently, it takes much time to calculate the output distribution, and check the thermal characteristics calculated in the power distribution calculation, and it is thus necessary to suitably interrupt operation during adjusting of the reactor core flow rate or operating of the control rods.

Conventionally, thermal characteristics of sixteen fuel assemblies surrounded by four strings of local power range monitors (LPRMs), which monitor local neutron flux level inside a nuclear core, has been estimated based on the indicated values of LPRM of a detector assembly contained inside four strings. Hereafter, position of a detector assembly is defined by the position of its string.

A conventional calculation of the thermal characteristics based on the indicated value of LPRM is explained with reference to FIG. 15. In this method, the minimum value of the critical power ratios of the sixteen fuel assemblies A1 through A16 surrounded by four strings is calculated, and at each point in height, the maximum value of linear heat generation rates of the sixteen fuel assemblies, are computed by a proportional calculation based on changing rates of values indicated by LPRMs of detector assemblies B1 through B4 each belonging to one of four strings.

In the conventional method of core monitoring, if the severest fuel assembly in terms of the thermal characteristics is not one of fuel assemblies A1, A4, A13 and A16 in FIG. 15, which are adjacent to a string, the LPRM detectors of detector assemblies B1 through B4 are away from (not adjacent to) the severest fuel assembly in terms of the thermal characteristics. Moreover, if the severest fuel assembly in terms of the thermal characteristics is one of the fuel assemblies A1, A4, A13, and A16, the values indicated by the LPRM detectors, one of which is close to but the others are away from the severest fuel assembly, are used in the computation. That is, for example, if the severest in terms of the thermal characteristics is a fuel assembly A1, detector assemblies B2 through B4 are away from the fuel assembly A1, and thus the thermal characteristics of the fuel assembly A1 are less correlated with values indicated by the LPRM detectors of the detector assemblies B2 through B4, and it is difficult to compute the thermal characteristics with a high degree of accuracy by the conventional method.

As mentioned above, in order to monitor the thermal characteristics at the time of operating of the reactor core flow rate or control rods in a boiling water reactor, the calculation takes a long time, and the operation of controlling the control rods and adjusting the reactor core flow rate must be stopped in at each cycle through FIG. 14. And when evaluating the thermal characteristics easily computed based on values indicated by LPRM monitors, the thermal characteristics cannot be evaluated with sufficient accuracy, thus it is necessary to allow a big margin for arrangement of core soundness.

SUMMARY OF THE INVENTION

Accordingly, it is an object of embodiments of this invention to provide an incore monitoring method which is able to compute thermal characteristics of a nuclear reactor more rapidly and continuously with a high degree of accuracy, and thereby to maintain fuel soundness and to shorten the time necessary for starting-up or adjusting fuel arrangement patterns.

Other and further objects of this invention will become apparent upon an understanding of the illustrative embodiments to be described herein or will be indicated in the appended claims while various advantages not referred to herein will be apparent to one skilled in the art upon employment of the invention in practice.

According to one aspect of the invention, there is provided an incore monitoring method of a nuclear reactor, including, measuring neutron flux levels at a plurality of pitch levels corresponding to a plurality of local power range monitor sensors arranged in an axial direction inside a detector assembly installed in the nuclear reactor, performing a power distribution calculation using a three-dimensional simulation to obtain a first calculation of thermal characteristics of a fuel assembly group consisting of fuel assemblies adjacent to the corresponding detector assembly, based on values indicated by the plurality of local power range monitor sensors of the corresponding detector assembly at a first time, performing a plurality of second calculation of thermal characteristics in which the power distribution calculation is not performed, based on values indicated by the plurality of local power range monitor sensors at second times, subsequent to the first time, and based on the thermal characteristics calculated in the first calculation at the first time, and monitoring the plurality of thermal characteristics calculated in the second calculation.

According to one aspect of the invention, there is provided an incore monitoring equipment of a nuclear reactor, including, a detector assembly configured to be installed in the nuclear reactor, including local power range monitor sensors to measure neutron flux levels at a plurality of pitch levels, a three-dimensional simulator for calculating a power distribution including first calculation of thermal characteristics of a fuel assembly group consisting of fuel assemblies adjacent to the corresponding detector assembly, based on values indicated by the plurality of local power range monitor sensors of the corresponding detector assembly at a first time, and a monitoring unit for performing a plurality of second calculations of thermal characteristics in which the power distribution calculation is not performed, based on values indicated by the plurality of local power range monitor sensors at second times, subsequent to the first time, and based on the first calculated thermal characteristics at the first time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 8A through 8J are schematic plan views of quartered reactor cores for explaining the status of a reactor core in the process of starting-up of the reactor core;

DETAILED DESCRIPTION OF THE INVENTION

Figure 1:
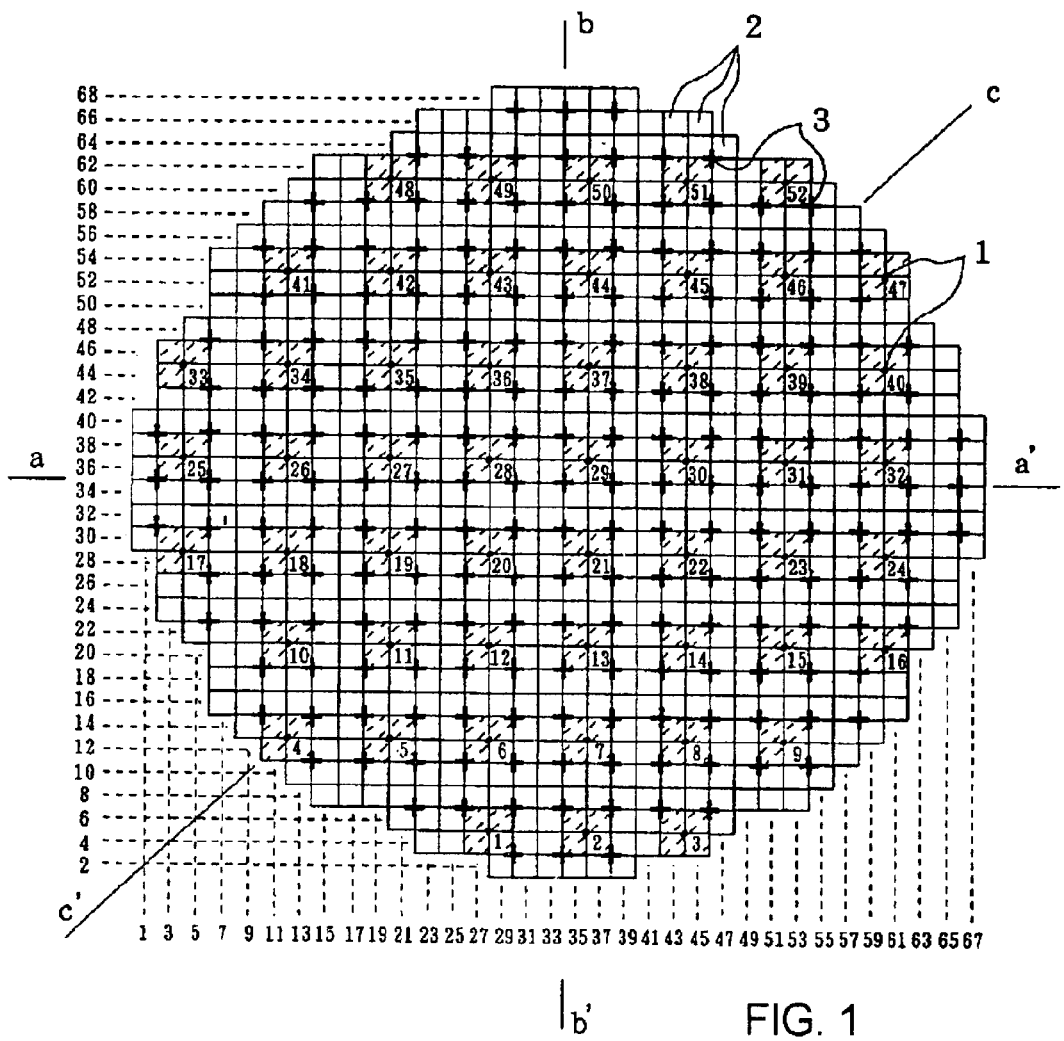
FIG. 1 is a schematic plan view of a reactor core of a 1300MWe class boiling water reactor designating positions of fuel assemblies, control rods and detector assemblies for explaining the incore monitoring method in accordance with embodiments of the invention.

Referring now to the drawings, wherein like reference numerals designate identical or corresponding parts throughout the several views, the embodiments of this invention will be described below.

A first embodiment of this invention is described with reference to FIGS. 1 through 4. FIG. 1 schematically shows an example of core arrangement of a boiling water reactor of 1,300 MWe class in a plan view. In the nuclear core, there is strings where detector assemblies are arranged. In each of the detector assemblies, local power range monitor (LPRM) detectors for monitoring in-core neutron flux level are arranged at approximately equal intervals in an axial direction of the reactor core, as shown in FIG. 2B.

Figure 2A:
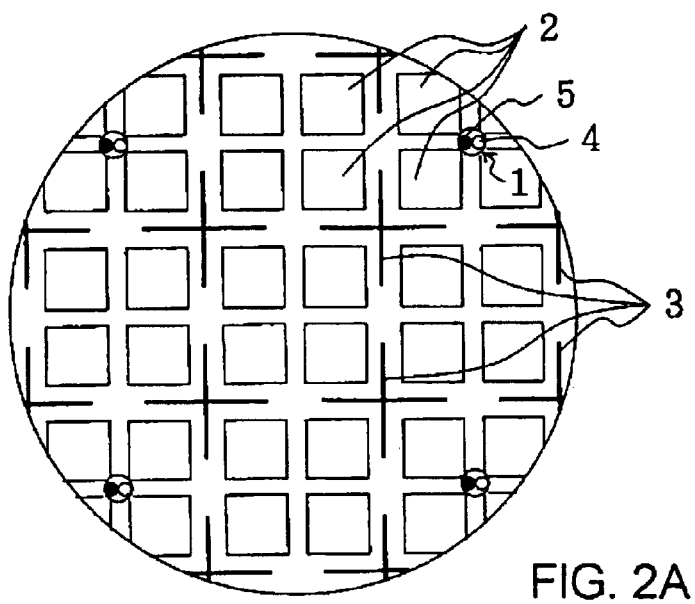
FIG. 2A is a detailed plan view showing a part of FIG. 1.

As shown in FIGS. 1 and 2A, a control rod 3 having a "cross" in cross-section is configured to be inserted in a center of corresponding four fuel assemblies 2 from beneath the reactor core (not illustrated), and detector assemblies 1 each comprising the four LPRM detectors 4 are arranged at approximately equal intervals in a diametrical parallel direction, in a proportion of one detector assembly 1 to sixteen fuel assemblies 2 and a proportion of one detector assembly 1 to four control rods 3.

Figure 2B:
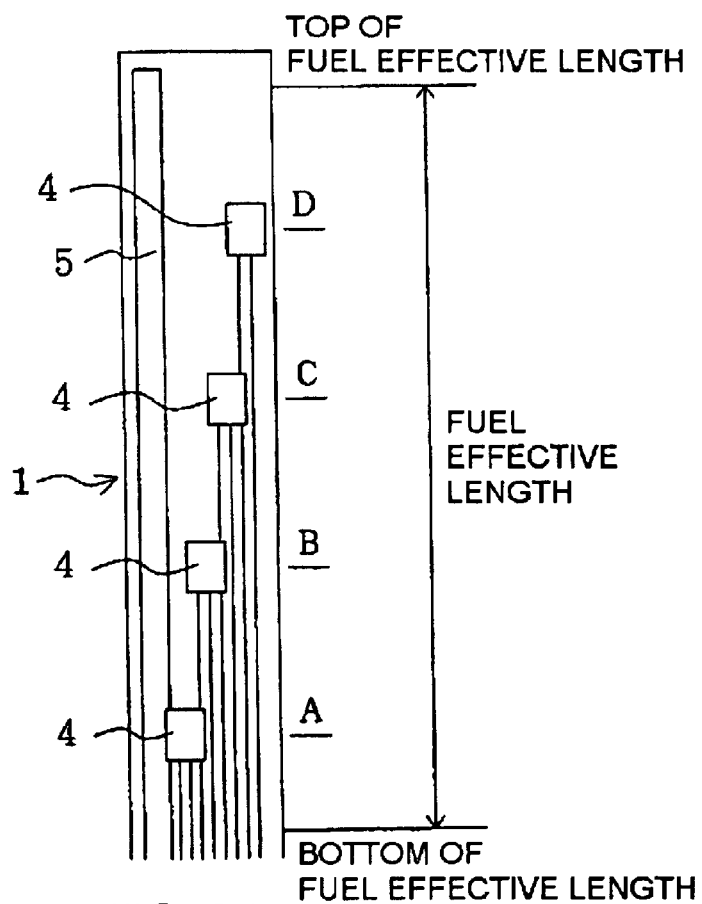
FIG. 2B is a schematic sectional side view showing an axial direction of FIG. 2A.

FIG. 2A, which is an enlarged potion of FIG. 1, shows the positions of the fuel assemblies 2, the control rods 3 and the detector assemblies 1 as a part of a reactor core, and FIG. 2B shows the composition inside the detector assembly 1 shown in FIG. 2A in an axial direction. As shown in FIG. 2B, in the detector assembly 1, four LPRM detectors 4, LPRM-A, LPRM-B, LPRM-C and LPRM-D from bottom to top, are arranged at approximately equal intervals in an axial direction.

The LPRM detector further comprises a TIP calibration channel 5 containing a traversing incore probe (TIP) (not shown) for calibrating the LPRM detectors 4 and for continuously monitoring neutron flux distribution or gamma flux distribution in an axial direction, where the TIP moves inside the TIP calibration channel 5.

Hereinafter, a node designates a length of a fuel effective length, in which nuclear fuel material is filled, divided by twenty-four or twenty-five. In the detecting assembly 1 illustrated in FIG. 2B, LPRM detector A is located at a pitch level of approximately the center of the third node and the fourth node from the bottom of the fuel effective length, LPRM detector B is located at a pitch level of approximately the center of the ninth node and the tenth node, LPRM detector C is located at a pitch level of approximately the center of the fifteenth node and the sixteenth node, and LPRM detector D is located at a pitch level of approximately the center of the twenty-first node and the twenty-second node.

Each LPRM detector 4 detects neutron flux level at a corresponding pitch level. Accordingly, a linear power heat generation rate, that is, an output per unit length of fuel at a pitch level corresponding to each LPRM detector, of a fuel assembly adjacent to the LPRM detector, is approximately proportional to a changing rate of a value indicated this LPRM detector. And an output of a fuel assembly adjacent to the LPRM detectors is approximately proportional to an average of changing rates of four LPRM detectors belonging to a corresponding string.

By using this correlation, thermal characteristics of a fuel assembly arranged around a string can be computed easily by changing rates of values indicated by the LPRM detectors, on the basis of calculation result of power distribution calculated by the three-dimensional reactor core simulator and the LPRM detectors and an actual measurement of plant data. That is, the linear heat generation rate and the critical power ratio around a string can be expressed with the following equations:

Linear Heat Generation Rate $$MFLPDAT(K,ISTR)=MFLPDIN(K,ISTR)\cdot(1+(1/FK(K))\cdot(LPRMAT(K,ISTR)/LPRMIN(K,ISTR)-1)) \quad (1),$$

where, $MFLPDAT(K,ISTR)$ is a ratio of the maximum linear heat generation rate of four fuel assemblies measured by means of the LPRM detectors around a string in the string position ISTR and at the pitch level K to an operational limit thereof, $LPRMAT(K,ISTR)$ is a value indicated by LPRM detector in the string position ISTR and at the pitch level K, $MFLPDIN(K,ISTR)$ is a ratio of the maximum linear heat generation rate of four fuel assemblies computed by power distribution calculation around a string in the string position ISTR and at the pitch level K to an operational limit thereof, $LPRMIN(K,ISTR)$ is a value indicated by LPRM detector in the power distribution calculation in the string position ISTR and at the pitch level K, and $FK(K)$ is a safety coefficient in calculation of the linear heat generation rate at the pitch level K.

Critical Power Ratio $$MFLCPAT(ISTR)=MFLCPIN(ISTR)\cdot(1+(1/FC)\cdot(LPAVAT(ISTR)/LPAVIN(ISTR)-1)) \quad (2),$$

where $MFLCPAT(ISTR)$ is a ratio of an operational limit of the critical power ratio to the minimum critical power ratio of four fuel assemblies measured by means of the LPRM detectors around a string in the string position ISTR, $MFLCPIN(ISTR)$ is a ratio of an operational limit of the critical power ratio to the minimum critical power ratio of four fuel assemblies computed in power distribution calculation measured around a string in the string position ISTR, $LPAVAT(ISTR)$ is a weighted-average of values indicated by four LPRM detectors, LPRM-A through LPRM-D, belonging to a string in the string position ISTR, $LPAVIN(ISTR)$ is a weighted-average of values indicated by four LPRM detectors, LPRM-A through LPRM-D, in the power distribution calculation belonging to a string in the string position ISTR, and $FC$ is a safety coefficient in calculation of the critical power ratio.

Figure 3:
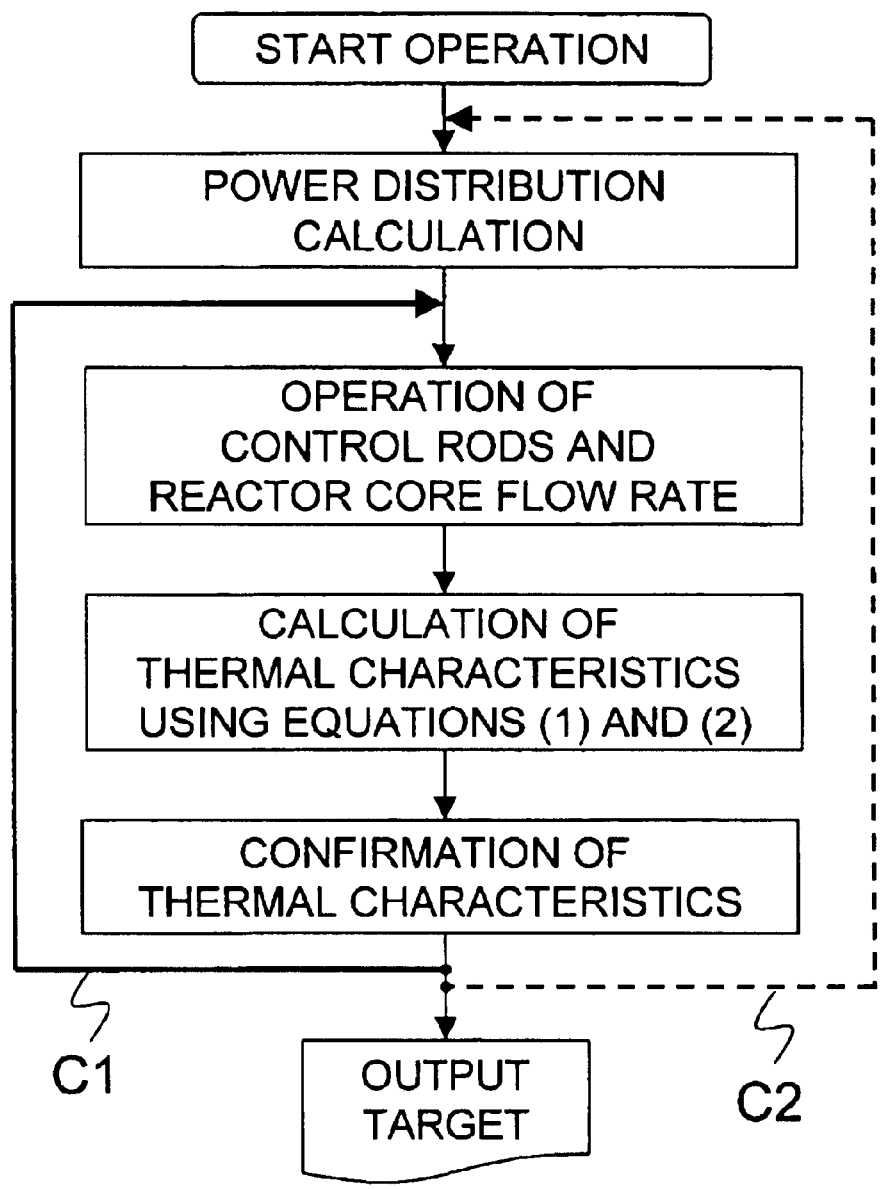
FIG. 3 is a flow chart showing a procedure of starting-up of a reactor core and adjustment of control rod patterns foe explaining an embodiment of the invention.
Figure 14:
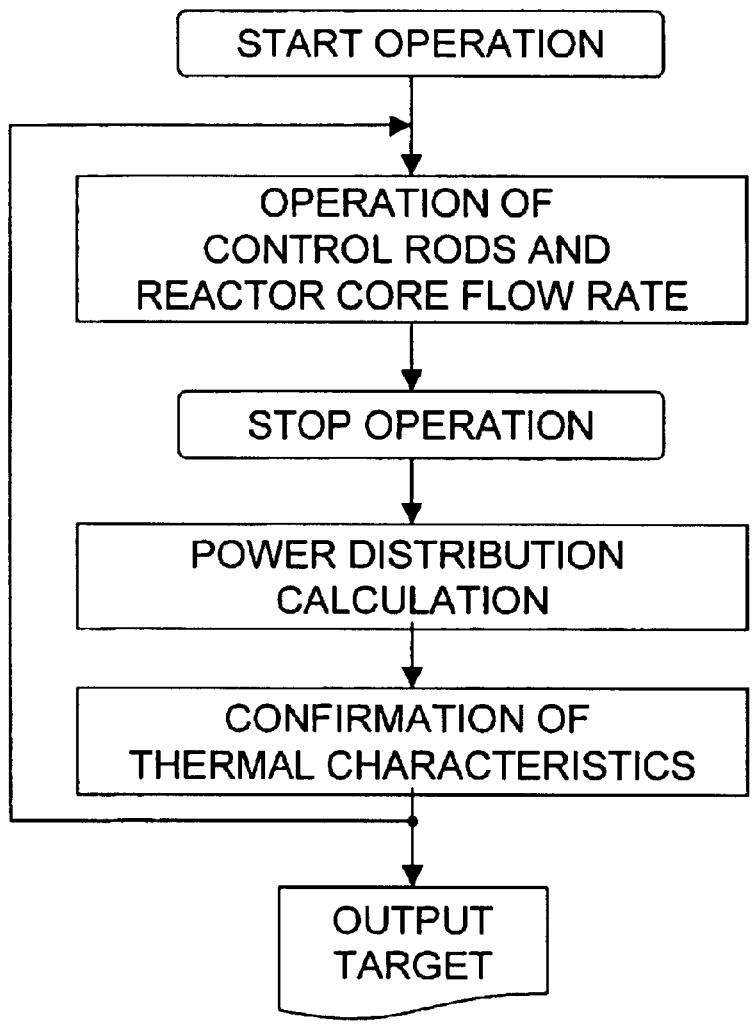
FIG. 14 is a flow chart showing one conventional general procedure of starting-up up of a reactor core and adjustment of control rod patterns.
Figure 15:
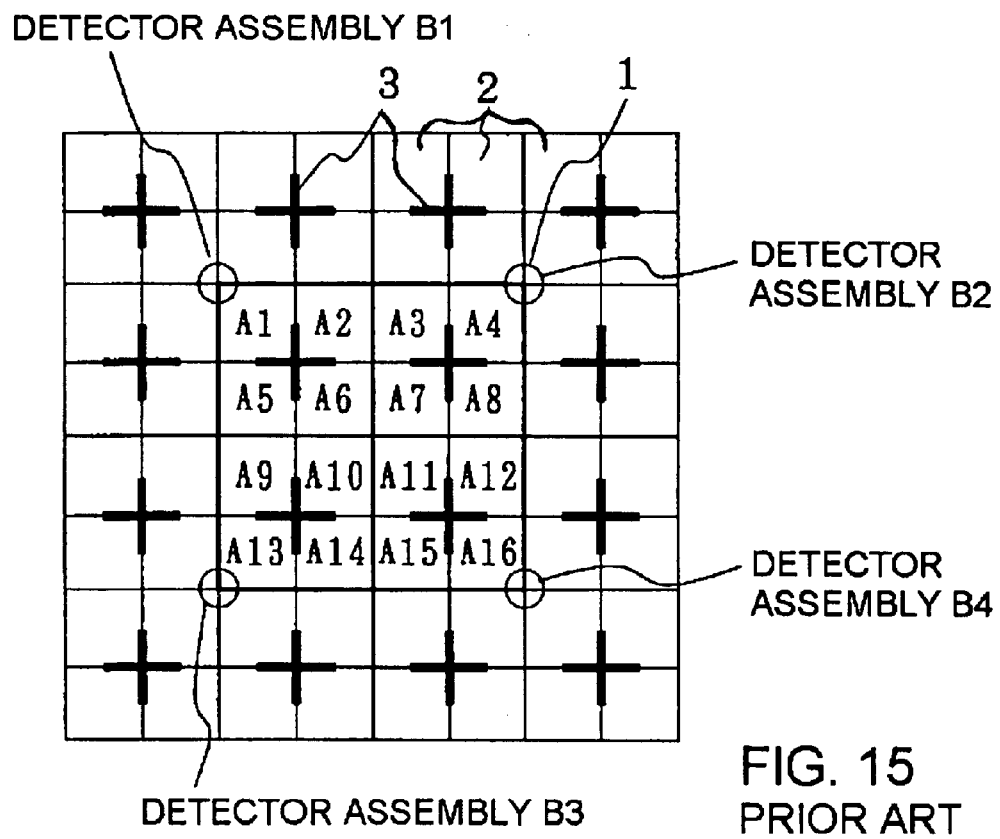
FIG. 15 is a partial plan view of a reactor core for explaining a conventional procedure for calculating thermal characteristics based on values detected LPRM detector.

Thus, in this embodiment concerning an incore monitoring method, the thermal characteristics can be computed using previously calculated values $MFLPDIN(K, ISTR)$ and $LPRMIN(K, ISTR)$ in equation (1) and $MFLCPIN(ISTR)$ and $LPAVIN(ISTR)$ in equation (2), and need not rely on power distribution calculation at the time of operating of control rods or adjusting of the reactor core flow rate. This result is shown in FIG. 3, which should be compared with FIG. 14. In FIG. 3, it is not necessary to stop operation of the control of the control rods and the adjustment of the reactor core flow rate, because the power distribution calculation, which takes a long time, is not performed every cycle but rather equations (1) and (2) are used which provide a fast solution using previously calculated power distribution values and current values of the LPRM detectors. That is, as shown as a solid line C1 in FIG. 3, cycles of calculation of the thermal characteristics at times when the power distribution calculation is not carried out and in operating of the control rods or adjusting of the reactor core flow rate, which is simplified calculation are performed continuously. And cycles of calculation of the thermal characteristics of power calculation performed in the power distribution calculation, shown as a dashed line C2 in FIG. 3, are performed frequently at fixed time interval or in response to a demand.

In equations (1) and (2), only the severest situation concerning the thermal characteristics among four fuel assemblies around each string is analyzed. This is because the thermal characteristics of fuel assemblies arranged in symmetrical positions are equal to each other due to the symmetry of the loading pattern of fuel assemblies and control rods mentioned above, and thus it is sufficient to monitor only the severest one.

Generally, a reactor core has a symmetrical property over one quarter of the core, or further one eighth symmetry, and the fuel assemblies loading pattern is determined so that the non-symmetrical portion is kept at a minimum when the symmetry cannot be ensured due to a kind or number of the fuel assemblies constructing reactor core. Symmetrically-arranged control rods are operated simultaneously, and the control rods operation pattern is arranged symmetrically. This is because the symmetric arrangement reduces power peaking in a radial direction and improves thermal characteristics, and because management of the fuel assemblies and the control rods becomes easier since burn-up histories of symmetrically-positioned fuel assemblies and neutron irradiation histories of symmetrically-positioned control rods are the same.

In FIG. 1, the detector assemblies are labeled 1 through 52. In case of number 1 of the detector assembly shown in FIG. 1, thermal characteristics of the four fuel assemblies loaded in the fuel-assembly coordinates (27,04), (29,04), (27,06) and (29,06) designated by X-Y coordinates, are similar to the thermal characteristics of the four fuel assemblies loaded in the coordinates (03, 42), (03, 40), (05, 42) and (5,40), the four fuel assemblies located in the coordinates (41, 66), (39, 66), (41, 64) and (39, 64), or the four fuel assemblies located in the coordinates (65, 28), (65, 30), (63, 28) and (63, 30).

Taken such symmetry into consideration, the thermal characteristics of all the fuel assemblies in a reactor core will be computed only by the detector assemblies shown in FIG. 1, except for a part of the fuel assemblies that are located outermost in a diametrical parallel direction of a reactor core. And the thermal characteristics of the outermost fuel assemblies are not severe because the power thereof is low due to a low neutron flux. Thus, according to this embodiment, if the thermal characteristics of fuel assemblies around strings are computed, the severest of the thermal characteristics can be extracted and confirmed not to exceed an operational limit; and thus it is not necessary to suspend operation of control rods or reactor core flow rate.

Figure 4:
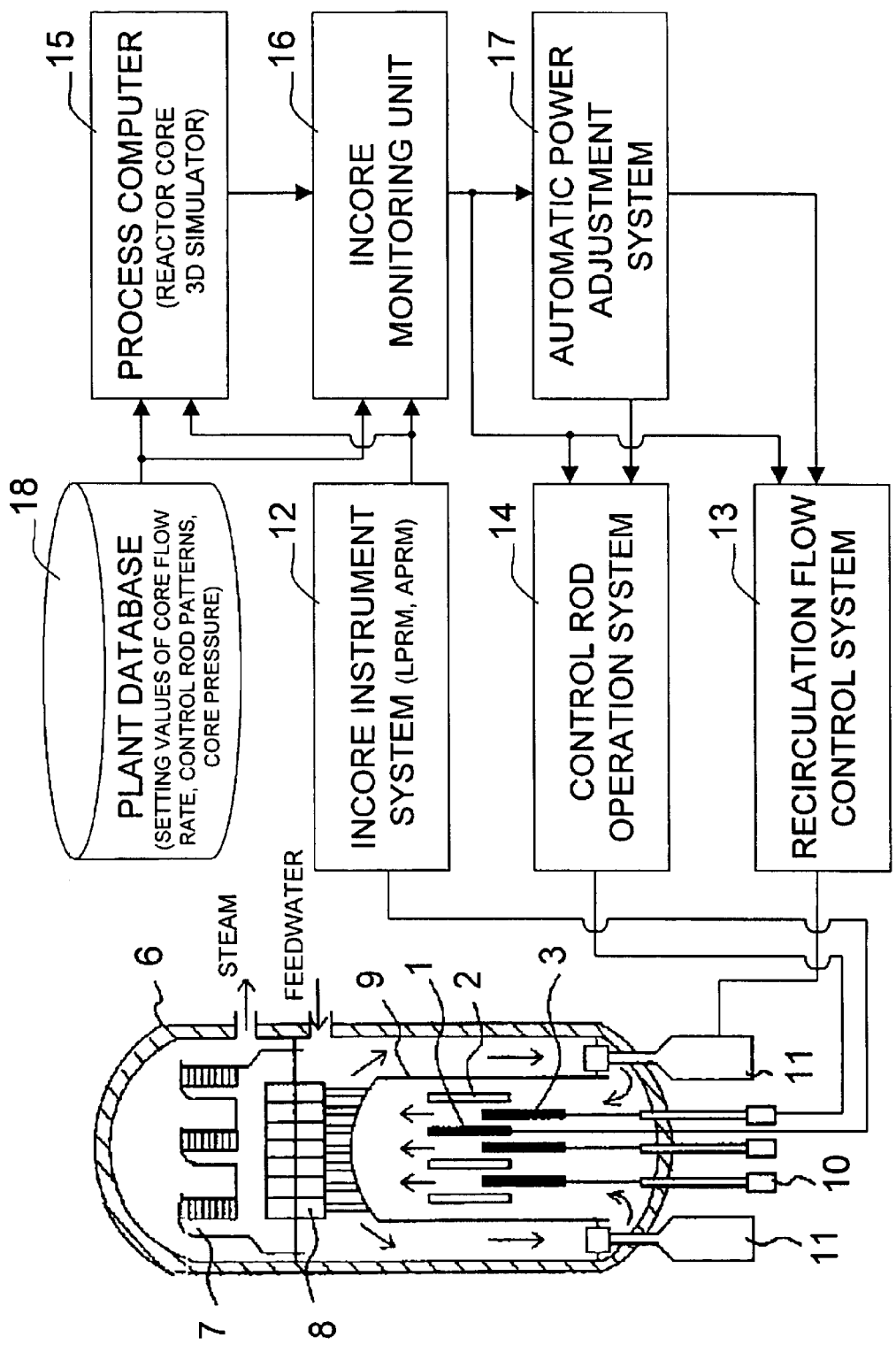
FIG. 4 is a block diagram of incore monitoring equipment for explaining an embodiment of the invention.

Next, incore monitoring equipment for performing an incore monitoring method according to this embodiment is explained with reference to FIG. 4. In FIG. 4, a core shroud 9 surrounds a reactor core and forms a coolant flow channel in a nuclear reactor pressure vessel 6. The reactor core comprises fuel assemblies 2, detector assemblies 1 and control rods 3 inserted from beneath the reactor core. A steam separator 8 which separates steam generated in the nuclear core from coolant, and a steam dryer 7 which removes moisture from steam, are installed above the core shroud 9.

Internal pumps 11 are installed in a lower part of the nuclear reactor pressure vessel 6 to control coolant flow in a reactor core, that is a core flow rate, by the adjusting rotational speed of the internal pumps 11. A plurality of control rod drive mechanisms 10 are installed under the nuclear reactor pressure vessel 6 and penetrate a lower part of the nuclear reactor pressure vessel 6 to control positions of the control rods 3. Control rod operation system 14 adjusts the position of control rods 3 via the control rod drive mechanisms 10, and recirculation flow control system 13 adjusts reactor core flow rate by changing frequencies of the internal pumps 11.

In increasing power or adjusting control rod patterns, incore monitoring unit 16 outputs a command signal to the recirculation flow control system 13 and/or the control rod operation system 14 to adjust the reactor core flow rate and/or the control rod patterns, respectively. Plant data stored in plant database 18 is composed of data groups of sensor values concerning flow rate of a nuclear reactor, control rod patterns, incore pressure, main steam flow rate, feedwater temperature, and so forth, and these are updated periodically.

Incore instrumentation system 12 equalizes a plurality of signals from the LPRM detectors, some of which is incore neutron flux instrumentation, processes signals from an average power range monitor (APRM) calibrated equivalent to a core thermal power. By receiving signals from the incore instrumentation system 12, the process computer 15 calculates power distribution, and the incore monitoring device 16 calculates thermal characteristics. The incore instrumentation system 12 also has an alert function and a function to output a command signal to stop the plant by rapidly inserting all control rods into the nuclear core.

A process computer 15 receives plant data from plant database 18 and actual measurement data from the incore instrumentation system 12, performs power distribution calculations by the three-dimensional reactor core simulator built in the process computer 15, and thereby computes thermal characteristics and a void fraction distribution of each fuel assembly. This power distribution is calculated at regular fixed time interval or in response to a request from an operator.

In an automatic power adjustment system 17, operating procedures of reactor core flow rate and control rod patterns at the time of starting-up, adjusting of control rod patterns and shutdown are preliminary installed. The automatic power adjustment system 17 automatically outputs a command signal of reactor core flow rate control and a command signal of control rod adjustment to the recirculation flow control system 13 and the control rod control system 14, respectively according to the procedures, thereby the reactor core flow rate and the control rods are adjusted automatically and followed by the procedures.

The incore monitoring unit 16 receives results of power distribution calculation by the process computer 15, plant data corresponding to the time of the power distribution calculation from the process computer 15, and values indicated by the LPRM detectors from the incore instrument system 12, and continuously receives updated plant data and values indicated by the LPRM detectors, and continuously computes the thermal characteristics of fuel assemblies around a string according to the equations (1) and (2).

When the computed thermal characteristics deviate from an operational limit, the incore monitoring device 16 outputs an operator alarm, transmits an automation stop signal to automatic output adjustment system 17, and transmits a command signal to stop control the reactor core flow rate and a command signal to prohibit adjusting of the control rods to the recirculation flow control system 13 and the control rod control system 14, respectively, thus adjustment of the reactor core flow rate and the operation of the control rods is stopped. In effect, the adjustments which were having the effect of increasing power output are now stopped until the thermal characteristics no longer exceed the operational limit.

Next, concrete examples of this embodiment concerning incore monitoring method is explained below.

FIRST EXAMPLE

In a first example of this embodiment, achieved by the incore monitoring system shown in FIG. 4, the process computer 15 calculates power distribution at fixed time intervals or in response to request of an operator, and the incore monitoring device 16 computes MLHGR and MCPR at a moment when these factors have not yet been calculated and the reactor core flow rate or the control rods is controlled, by using the equations (1) and (2) and based on the calculation result of the process computer 15. Moreover, if these computed thermal characteristics exceed corresponding operational limit, an alarm is activated and the control of the reactor core flow rate and the control rods is stopped.

Here, when the incore monitoring device 16 receives linear power generation rates around a string in calculating power distribution from the process computer 15, the linear power generation rates in pitch levels correspond to the four LPRM detectors. LPRM-A is located between the third node, from the bottom of fuel effective length, which is divided by twenty-four or twenty-five as one node, and the fourth node, LPRM-B located between the ninth node and the tenth node, LPRM-C located between the fifteenth node and the sixteenth node, and LPRM-D located between the twenty-first node and the twenty-second node. Each LPRM detector is located at almost the middle point between two nodes, and receives a linear power generation rate at the corresponding pitch level.

Alternatively, the higher value of two linear heat generation rates corresponding to two nodes arranged adjacent up and down may be received, that is, for example, an LPRM detector receives a higher one of the linear heat generation rates at the third node as compared to the fourth node. Also, the highest value may be taken among six linear heat generation rates corresponding to six sequential nodes by allocating each LPRM detector together with the TIP detector in the TIP channel 5 to six sequential nodes. In addition, when the fuel effective length is divided by twenty-five, the twenty-fifth node, which is the highest, may correspond to LPRM-D which is the highest of the four LPRM detectors, or can be ignored in calculation of the thermal characteristics of twenty-four nodes because the linear heat generation rate at the top node is relatively low. The incore monitoring device 16 calculates a linear heat generation rate at any pitch level by using a rate of change of values indicated by the LPRM detectors based on the received linear power generation rates.

SECOND EXAMPLE

In a second example of this embodiment, acquired by a modification of the above-mentioned first example, when the incore monitoring device 16 receiving thermal characteristics as a basis computed by the power distribution calculation, the incore monitoring device 16 receives the severest factors, that is, the minimum value of the critical power ratio of four fuel assemblies arranged adjacent to each string and other fuel assemblies arranged symmetrically to the four fuel assemblies, and the maximum value of the linear heat generation rates at pitch levels corresponding that of LPRM detectors, to calculate thermal characteristics.

If symmetry of fuel loading patterns cannot be completely assured, then thermal characteristics even for symmetrically arranged fuel assemblies will differ from each other. However, this second example uses the property that a rate of change of thermal characteristics in operation of the control rods or the reactor core flow rate at one position is approximately equal to that at a corresponding symmetrical position. The control rods are operated in a symmetric manner thus maintaining the equality of the rate of change of the thermal characteristics of symmetric fuel assemblies.

In this second example, the severest factors, that is, the minimum value of the critical power ratios and the maximum value of the linear heat generation rates of four fuel assemblies arranged adjacent to each string and other fuel assemblies arranged symmetrically to the four fuel assemblies, are computed based on a changing rate of values indicated by LPRM detectors. If this computation is performed at every strings, the severest factors, that is, the minimum values of the critical power ratios and the maximum values of the linear heat generation rates of all fuel assemblies except a part at peripheries of the reactor core, can be found by the computation.

THIRD EXAMPLE

In a third example of this embodiment, acquired by a modification of the above-mentioned second example, in computation of the critical power ratio, the critical power ratio is compensated by taking into account the fact that the critical power ratio is changed due to a change of the reactor core flow rate.

Figure 5:
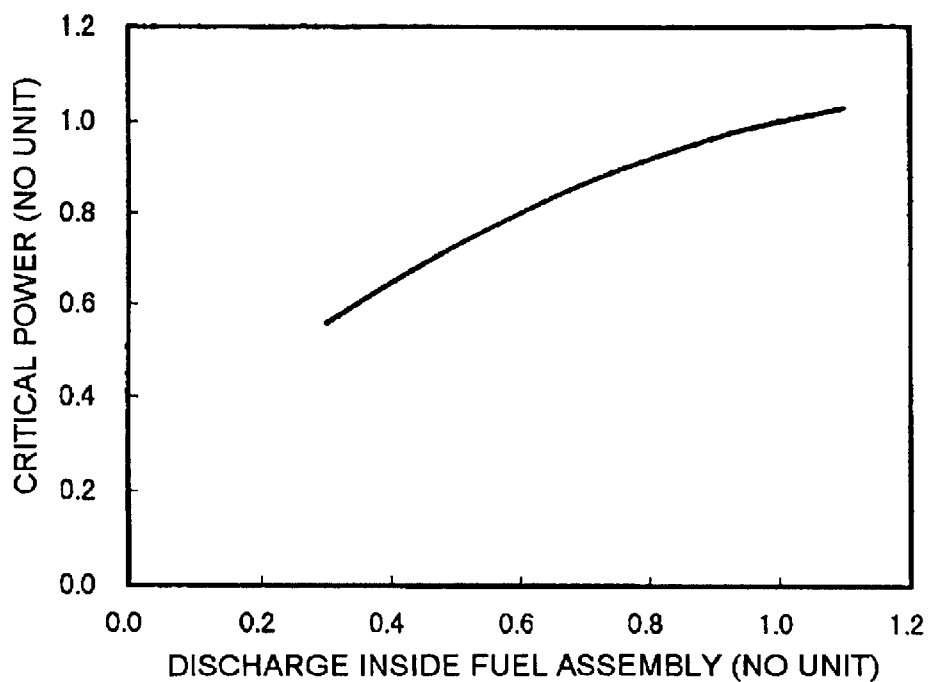
FIG. 5 is a graph schematically showing a relation between critical power and flow rate in a fuel assembly for explaining an embodiment of this invention.

The critical power ratio is defined as a ratio of critical power in which boiling transition arises to an output power of a fuel assembly. If the coolant discharge increases, the critical power also increases because of an increase in the cooling capacity. FIG. 5 shows a relation of flow rate of coolant in a fuel assembly and a critical power of a corresponding fuel assembly, both of which are of no quantity unit. Here, a value of 1.0 (no unit of quantity) of flow rate in a fuel assembly is equivalent to a coolant discharge inside a fuel assembly per one fuel assembly in rated reactor core flow rate.

As known by the relation shown in FIG. 5, without consideration of effect that the critical power increases in accordance with the increase in the reactor core flow rate, the computed ratio of the operation limit of the critical power ratio to the critical power ratio acquired from the equation (2) is overestimated compared with an actual ratio at the time of an increase in the reactor core flow rate, and is underestimated compared with an actual ratio at the time of a decrease in the reactor core flow rate.

Then, in this third example, a correlation of a reactor core flow rate and critical power is approximated with a polynomial or a function, based on the reactor core flow rates (discharges inside a fuel assembly) at which time when the power distribution is computed at periodic fixed times or in response to a request from an operator, and when the reactor core monitoring device 16 calculates thermal characteristics, that is, when the critical power ratio is calculated. That is, a reactor core flow rate and a corresponding critical power at each point is acquired, thereby by this acquired correlation, a polynomial or function may be obtained which approximates a curve as shown in FIG. 5 or a plotted line chart.

Next, with this approximated polynomial or function, a ratio of a critical power corresponding to a reactor core flow rate in calculating the power distribution to a critical power corresponding to a reactor core flow rate in calculating the minimum critical power ratio, is calculated as a correction coefficient, and compensated critical power is calculated by multiplying a right side member of the above-mentioned equation (2) by this correction coefficient, thereby the critical power ratio can be corrected and be acquired as a value in which a change of critical power due to a change of the reactor core flow rate is reflected.

FOURTH EXAMPLE

In a fourth example of this embodiment, acquired by a modification of the above-mentioned first example or second example, in computation of the linear heat generation rate, the linear heat generation rate is compensated by considering a percentage change of a linear heat generation rate and a percentage change of values indicated by LPRM detector.

Figure 6:
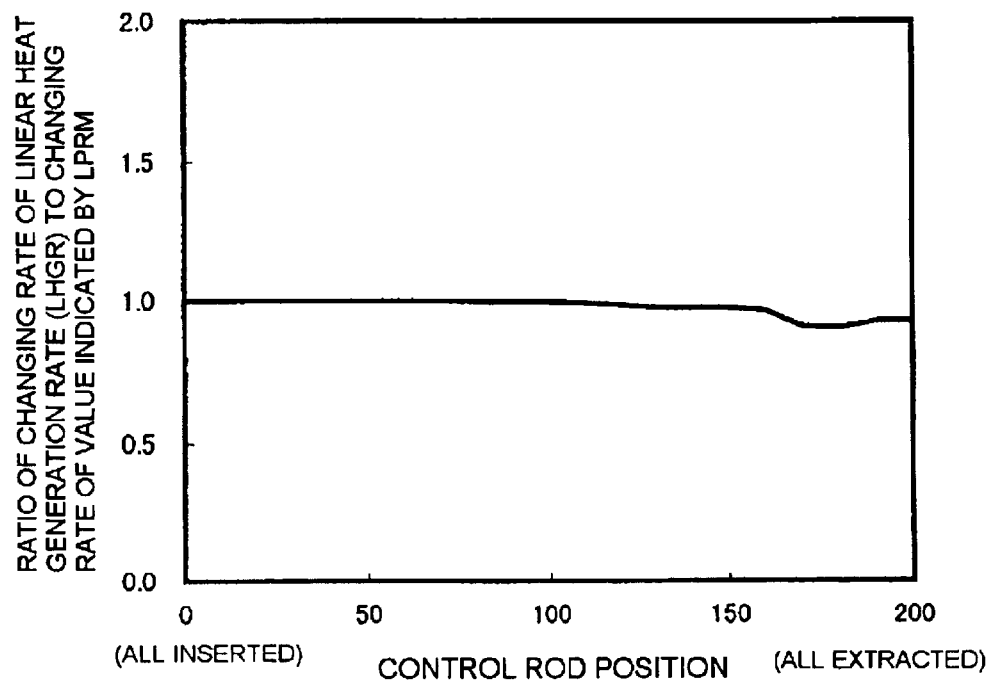
FIG. 6 is a graph schematically showing a relation between an insertion position of the control rod adjacent to a string and a ratio of changing rate of a linear heat generation rate (at a pitch level corresponding an LPRM detector, LPRM-A, around the string) to changing rate of a value indicated by the LPRM detector LPRM-A.

As already mentioned, although a linear heat generation rate at a vicinity of LPRM detector is approximately proportional to a percentage change of values indicated by the LPRM detector, the correlation of the linear heat generation rate and the percentage change of values indicated by the LPRM detector varies comparatively, from one locality of a control rod to another. FIG. 6 shows a correlation of an insertion position of a control rod and a ratio of the maximum of changing rates (e.g. increasing rates) of the linear heat generation rates (at pitch level of LPRM-A) of four fuel assemblies arranged adjacent in one string, to the a changing rate of values indicated by LPRM-A, where one control rod adjacent to the string has been extracted from a state where an effective length of the control rod is fully inserted, that is, a control rod position is set to zero, to a state that all of the control rod is fully pulled out, that is, the control rod position is set to 200.

Apparently recognized from FIG. 6, the ratio of a changing rate of the heat generation rate to a changing rate of values indicated by LPRM detector is approximately 1.0. However, the ratio deceases a little between 150 and 200 of the control rod position. That is, in this range, the increasing rate of the linear power heat generation rate becomes smaller compared with the increasing rate of values indicated by the LPRM detector.

Thus, the changing rate (e.g. increasing rate) of the linear heat power generation rate at the pitch level of each LPRM detector is designated as a function of the changing rate (e.g. increasing rate) of values indicated by the corresponding LPRM detector and a control rod position, by a graph as shown in FIG. 6. As for the LPRM-A as shown in FIG. 6, the changing rate of values indicated by LPRM detector is almost equal to the changing rate of the linear heat generation rate in case of the control rod position being between 0 and 150.

In this fourth example as a modification of the first or second example, when the maximum linear heat generation rate at the pitch level of each LPRM detector of the four fuel assemblies arranged adjacent to one string is calculated (see FIG. 2A), a changing rate (an increasing rate) of the linear power generation rate is acquired as a function of a changing rate of values indicated by these LPRM detectors and control rod position, based on positions of the control rod corresponding to when the power distribution is calculated at periodic fixed times or in response to a request from an operator (i.e., a first time), and when the maximum linear heat generation rate is calculated, that is, when the incore monitoring device 16 calculates thermal characteristics (i.e., a second, subsequent time). That is, by approximating a curved graph or plotted polygonal line, such as one shown in FIG. 6, showing a correlation of the control rod position and a ratio of a changing rate of the linear heat generation rate and a changing rate of values indicated by a LPRM detector, the changing rate of the linear heat generation rate is designated as a function of two parameters composed of the changing rate of values indicated by the LPRM detector and a rate of insertion of the control rod.

In this way, the maximum linear heat generation rate calculated by equation (1) is compensated with a function acquired as discussed above. For example, an changing rate of the linear heat generation rate is calculated from the control rod position and an changing rate of values indicated by the LPRM detector at the above-mentioned first and second times (see FIG. 6), and the maximum linear heat generation rate is acquired by multiplying the calculated increasing rate by the value calculated by the equation (1), thereby, the maximum linear heat generation rate can be compensated, and thus, the maximum linear heat generation rate can acquire a value reflected by a change of values indicated by the LPRM detector due to a change of insertion position of the control rod.

FIG. 6 shows as a result of acquiring a correlation of control rod positions and a ratio of a changing rate of the linear heat power generation rate to a changing rate of values indicated by the LPRM detector at pitch level of LPRM detector A, however, correlations at pitch level of LPRM-B, LPRM-C and LPRM-D corresponding to this figure can be acquired in the same way mentioned above, and thereby the linear heat generation rate can be compensated more appropriately.

FIFTH EXAMPLE

In a fifth example of this embodiment, acquired by a modification of the above-mentioned first example or second example, in computation of the linear heat generation rate at focused node position which is not adjacent a pitch level of a LPRM detector, the linear heat generation rate at such focused node position is calculated by using a value acquired by interpolation of changing rates of values indicated by LPRM detectors being above and below the focused node position, while utilizing fact that linear heat generation rate transits continuously in an axial direction.

In the detector assembly shown in FIG. 2B, LPRM-A is between the third node, from the bottom of fuel effective length, and the fourth node, LPRM-B is between the ninth node and the tenth node, LPRM-C is between the fifteen node and the sixteen node, and LPRM-D is between the twenty-first node and the twenty-second node, each of which is in the middle of corresponding two nodes. When LPRM detectors are arranged as mentioned above, suppose that the linear heat generation rate locally changes at a certain rate, as a simplified example, a percentage change of the linear heat generation rate is applied to the interpolation.

When the computed percentage changes of linear heat generation rates at node positions of LPRM-A and LPRM-B are a and b, respectively, the percentage change of linear heat generation rate at pitch level of a middle point of the sixth node and the seventh node, that is just between the two LPRM detectors, is, $$a+(b-a)/2=(a+b)/2,$$

and similarly, the percentage change of linear heat generation rate at pitch level of a middle point of the seventh node and the eighth node is, $$a+2\cdot(b-a)/3=(a+2b)/3.$$

In addition, with regard to the first node and the second node at the bottom and the twenty-third node and the twenty-fourth node at the top, though no LPRM is arranged near these nodes, output is low due to leakage of neutrons from the bottom or top of the reactor core, therefore these nodes are never a maximum of the linear heat generation rate and it is not necessary to monitor there nodes.

In this example, using four LPRM detectors, the linear heat generation rate at focused pitch level can be calculated with high precision, without directly detecting at the focused pitch level.

SIXTH EXAMPLE

LPRM detectors may be in a bypass state in which signals are intentionally intercepted and not used due to failure such as leakage of an electrolytic-dissociation gas, or disconnection, or due to inspection. In this case, the reactor core monitor 16 cannot receive suitable values directed by a LPRM detector in a failure or a bypass state from the reactor core instrumentation system 12, and thermal characteristics of fuel assemblies adjacent to a string including the LPRM detector cannot be calculated.

As shown In FIG. 1, since strings exist with c–c' as an axis of symmetric, when one of LPRM detectors included in a string is in a failure or a bypass state and the string is not a string on the axis of symmetric c–c', there is another LPRM detector in the same pitch level of, and symmetric to, the LPRM detector in a failure or a bypass state.

In a sixth example of this embodiment, acquired by a modification of the above-mentioned first example or second example, utilizing symmetric properties of the LPRM detectors, thermal characteristics around a string including a LPRM detector being in a failure or a bypass state is calculated by a substituted the value of a changing rate of values indicated by the corresponding LPRM detector in the same pitch level of, and symmetric to, the LPRM detector in the failure or bypass state. This example utilizes symmetric properties of control rod patterns, that is, a fact that a changing rate of values indicated by one LPRM detector is equal to that of values indicated by a symmetrically-arranged LPRM detector.

In this sixth example, when LPRM-A included in a string numbered 1 in FIG. 1 is in a failure or a bypass state, the incore monitoring device 16 receives values indicated by LPRM-A included in a string numbered 17, symmetric to the number 1 around the axis of symmetry c–c', and the incore monitoring device 16 treats the values received from LPRM-A of the number 17 as a substituted values for LPRM-A of the number 1 and the calculation is performed.

Thus, even if a part of LPRM detectors is in a failure or a bypass state, the thermal characteristics of fuel assemblies adjacent to a string including such a LPRM detector can be computed with high accuracy.

SEVENTH EXAMPLE

In the above-mentioned sixth example, since a LPRM detector on the axis of symmetry c–c' does not have another alternative LPRM detector, if such LPRM detector on the c–c' axis is in a failure or a bypass state, a substitution value cannot be acquired. Moreover, a substitution value cannot be calculated when two or more LPRM detectors at symmetrical positions are in failure or a bypass state simultaneously.

Figure 7:
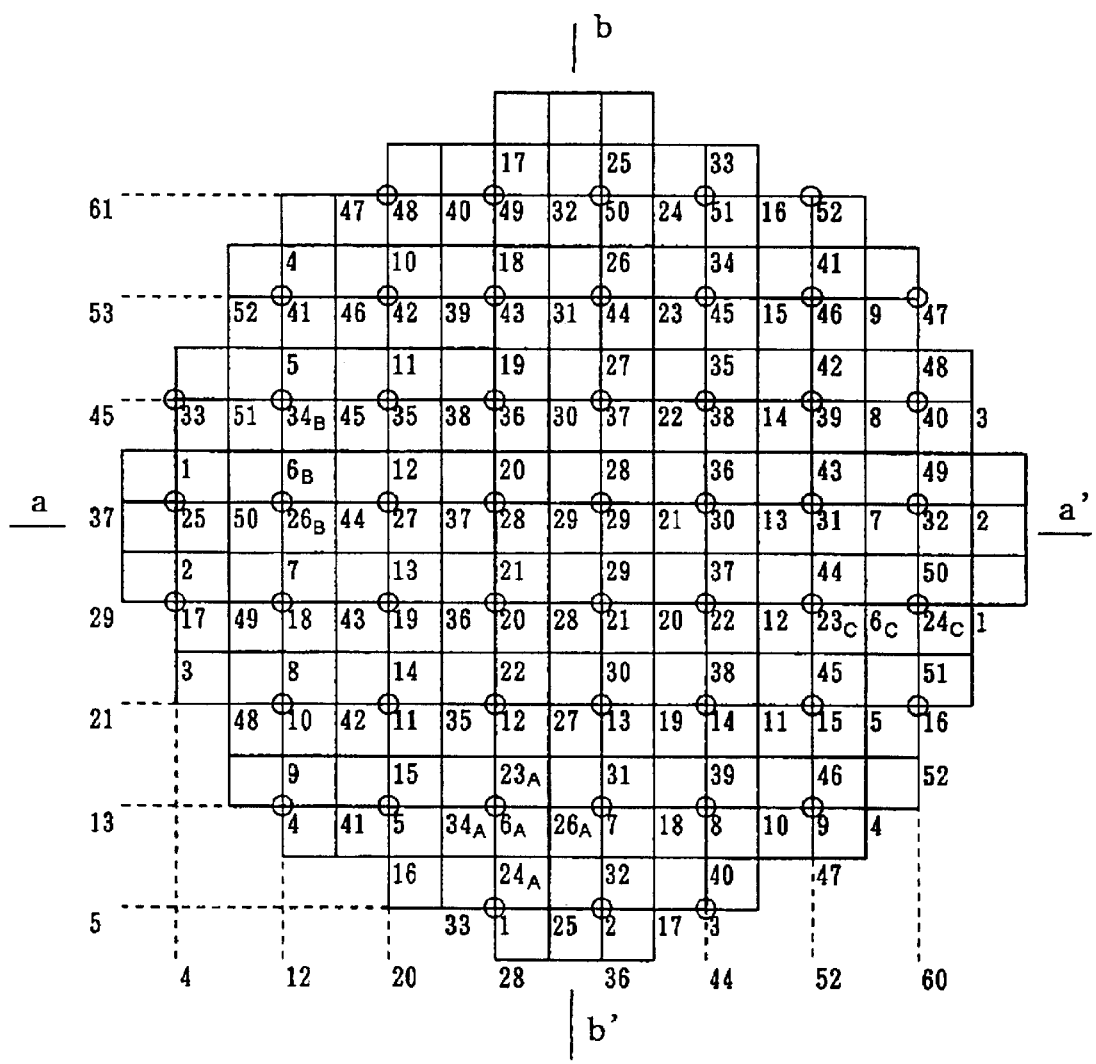
FIG. 7 is a schematic plan view showing rotational symmetry of locations of detector assemblies in a nuclear core shown in FIG. 1 around axis a–a' and axis b–b'.

This seventh example of this embodiment can be applied to this situation in the sixth embodiment, by considering expanding string positions with two axes of symmetry a–a' and b–b' shown in FIG. 1. FIG. 7 shows a plain view of a reactor core expanding strings. In FIG. 7, square designates a control rod and four fuel assemblies adjacent to the control rod, that is, a control rod cell, and each number in upper left corner of a square grid is a string number. Circled strings in FIG. 7, numbers 1 through 52, designates strings in which a detector assembly 1 exists, that is, real-strings, and except for these real-strings, corresponding numbers designate numbers of real-strings expanded in rotational symmetry.

In FIG. 7, expanded strings adjacent to a string number 6A are strings numbered 23A, 34A, 26A and 24A. That is, in view of symmetry, strings number 23A, 34A, 26A and 34A, which are closest to the string number 6a, surrounds the string number 6A. Thus, if one LPRM detector of the string number 6A is in a failure or a bypass state, an average of a changing rate of values indicated by at least one LPRM detector included in a string adjacent to the string number 6a in a symmetrical expansion, at the same pitch level of the failed LPRM detector, is used as a substitution. For example, one LPRM detector may be substituted in string number 26B or 34B adjacent expanded string 6B or one LPRM detector may be substituted in string number 23C or 24C adjacent expanded string 6C.

Additionally, as a modification of this example, when detector assemblies are arranged symmetrically in the reactor core, one LPRM detector is in a failure or a bypass state, values outputted from one LPRM detector which is in the same pitch level of, and symmetrical to, the failed LPRM detector is used for a substitute to calculate thermal characteristics.

In this embodiment including seven examples explained above, it is also possible to suitably combine two or more examples.

Next, as an effect of this embodiment of an incore monitoring method in this invention, a result of an off-line three-dimensional reactor core simulator acquired in response to the incore monitoring method is described.

Figure 8A:
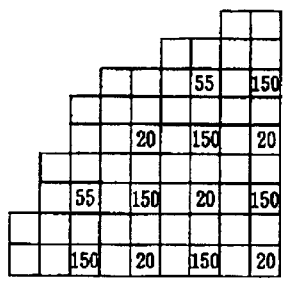
Figure 8B:
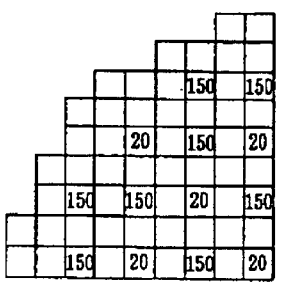
Figure 8C:
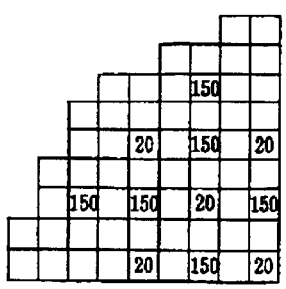
Figure 8D:
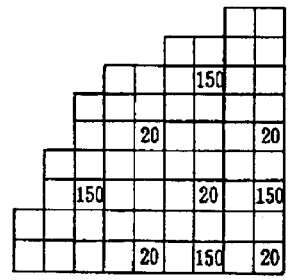
Figure 8E:
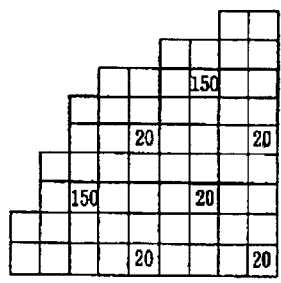

FIGS. 8A through 8I show reactor core status 1 through 9 in the middle of gaining a power output, with a legend as shown in FIG. 8J. Since a control rod pattern is symmetrical in one fourth core regions, each status figure of FIGS. 8A through 8I shows one fourth of ranges of a reactor core, and the power output and the flow rate are shown as a percentage by setting a rated thermal power output and rated reactor core flow rate as 100%.

Power distribution calculation is carried out in a reactor core status 1 shown in FIG. 8A, and then, thermal characteristics in reactor core status 2 through 6 in FIGS. 8B through 8F, respectively, are calculated by the incore monitoring method, based on a calculation result of the reactor core status 1. These results are compared with the calculation result of thermal characteristics in respective status by the off-line three-dimensional reactor core simulator.

Figure 8F:
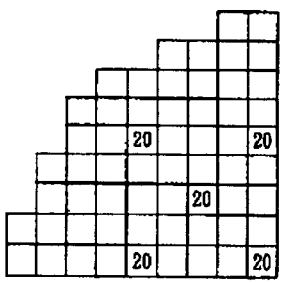
Figure 8G:
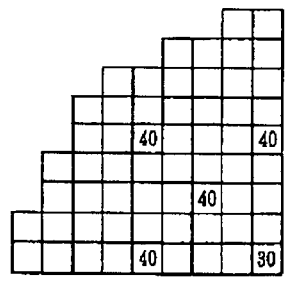
Figure 8H:
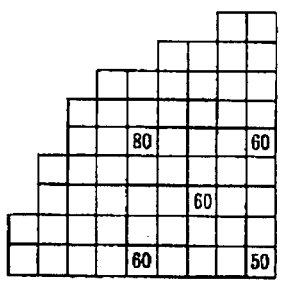
Figure 8I:
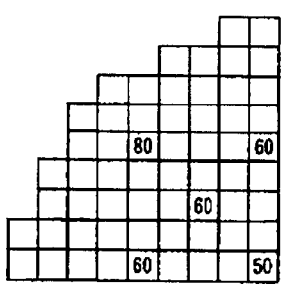

Moreover, suppose that a power distribution calculation is carried out in a reactor core status 6 shown in FIG. 8F. The thermal characteristics in reactor core status 7 through 9 in FIGS. 8G through 8I, respectively, are calculated by the incore monitoring method based on a calculation result of the reactor core status 6, and the results are compared with the calculation result of thermal characteristics in the respective status by the off-line three-dimensional reactor core simulator.

FIGS. 9 through 12 show the calculation results of linear heat generation rates at a pitch level of each LPRM detector based on a changing rate of values indicated by the respective LPRM detector included in the detector assembly number 26 shown in FIG. 1. FIGS. 9 through 12 show behaviors of a ratio of the linear heat generation rate to an operational limit of the linear heat generation rate, which is instead of, and as significant as, the linear heat generation rate as such, and reactor status 1 through 9 corresponds to the above-mentioned status in FIGS. 8A through 8I, respectively. Here, a solid line shows the ratio acquired from the response by the incore monitoring method of this invention, and a dotted line shows the ratio calculated by the three-dimensional reactor core simulator based on actual linear heat generation rates.

Figure 9:
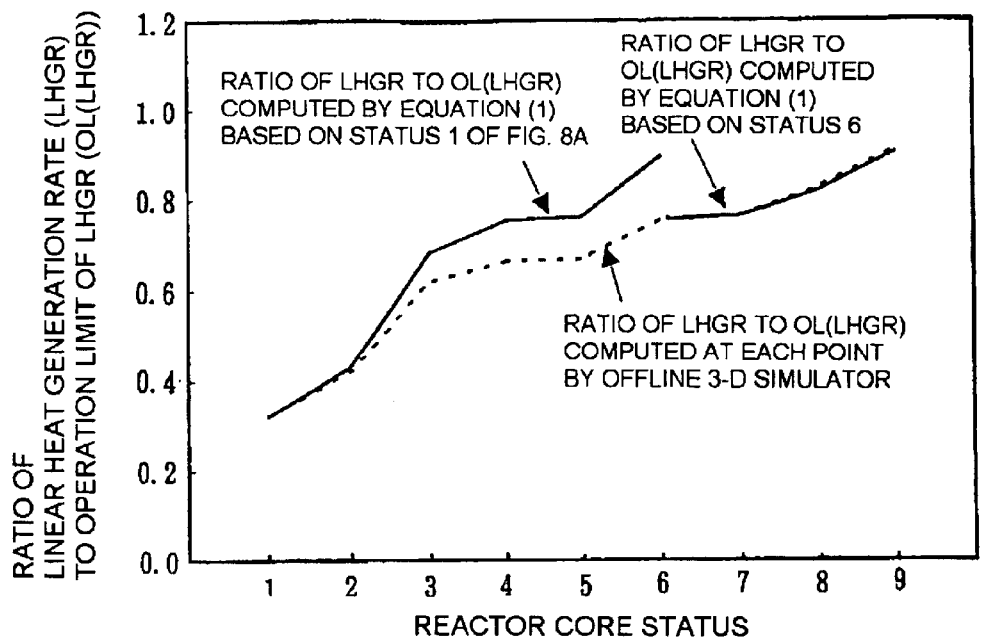
FIG. 9 is a graph schematically showing a relation between a ratio of a linear heat generation rate to an operation limit thereof and a reactor core status for explaining characteristics of an embodiment of the invention.
Figure 10:
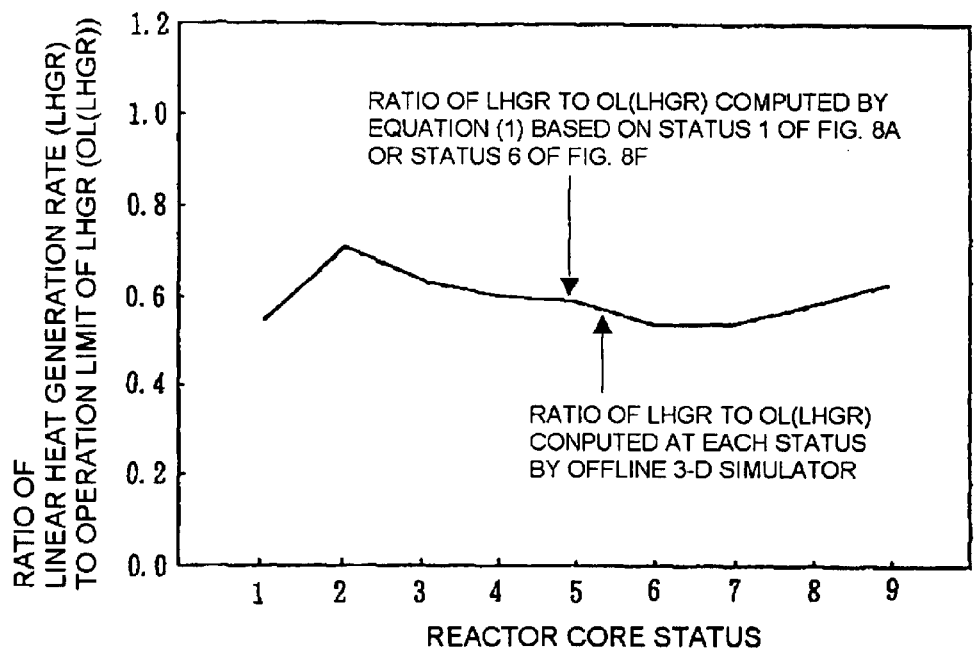
FIG. 10 is a graph schematically showing a relation between a ratio of a linear heat generation rate to an operation limit thereof and a reactor core status for explaining characteristics of an embodiment of the invention.
Figure 11:
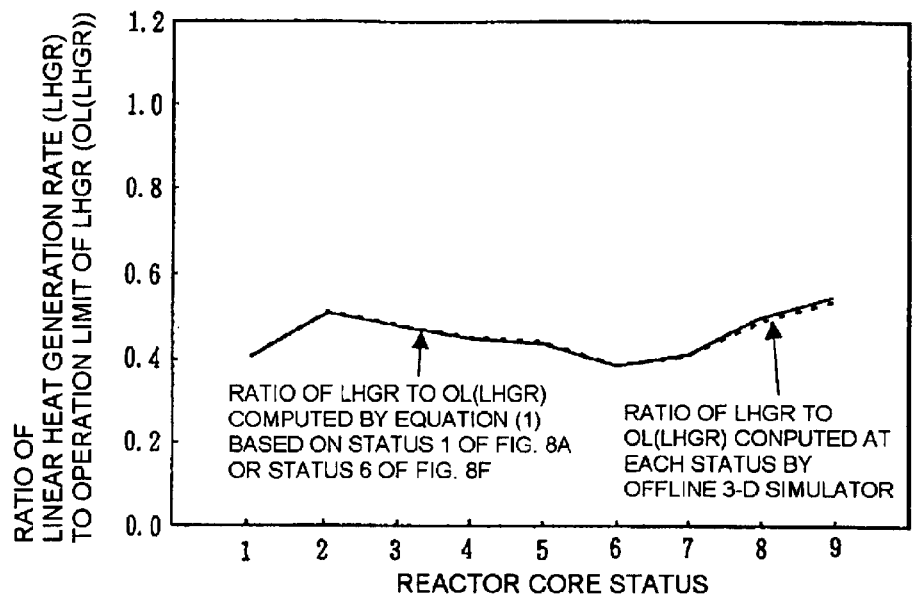
FIG. 11 is a graph schematically showing a relation between a ratio of a linear heat generation rate to an operation limit thereof and a reactor core status for explaining characteristics of an embodiment of the invention.
Figure 12:
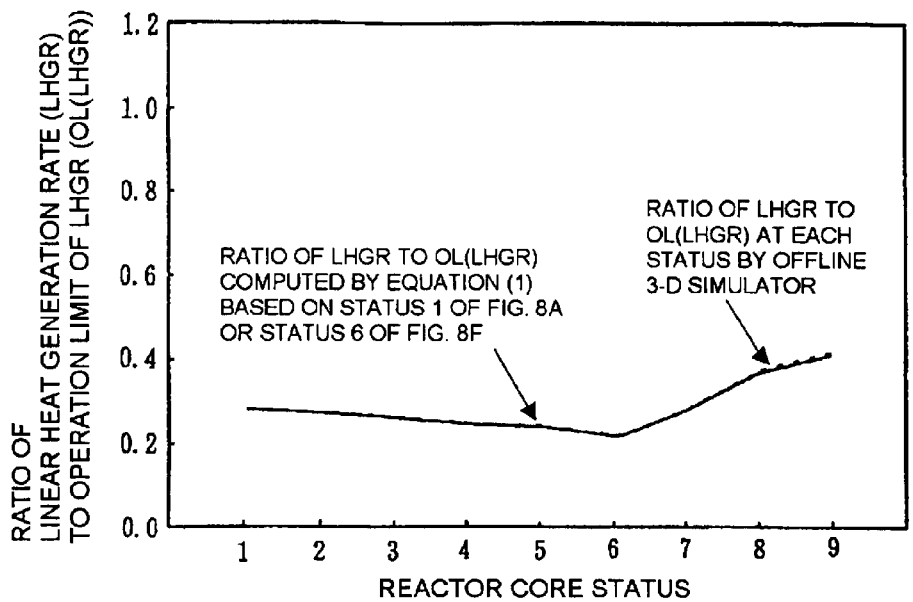
FIG. 12 is a graph schematically showing a relation between a ratio of a linear heat generation rate to an operation limit thereof and a reactor core status for explaining characteristics of an embodiment of the invention.

FIG. 9 corresponds to pitch level of LPRM-A, and here the linear heat generation rate is the maximum of the linear heat generation rates of fuel assemblies around a string between the third node and the fourth node. Similarly, FIG. 10 corresponds to pitch level of LPRM-B, and here the linear heat generation rate is the maximum of the linear heat generation rates of fuel assemblies around a string between the ninth node and the tenth node. FIG. 11 corresponds to pitch level of LPRM-C, and here the linear heat generation rate is the maximum of the linear heat generation rates of fuel assemblies around a string between the fifteenth node and the sixteenth node. FIG. 12 corresponds to pitch level of LPRM-D, and here the linear heat generation rate is the maximum of the linear heat generation rates of fuel assemblies around a string between the twenty-first node and the twenty-second node.

In addition, in FIGS. 9 through 12, calculation result of the linear heat generation rate by the incore monitoring method according to equation (1), without compensation of control rod positions as mentioned in the fourth embodiment. FIGS. 9 through 12 show that in the reactor core monitoring method, the acquired result is better in accuracy than that based on a changing rate of values indicated by the LPRM detectors, throughout in the reactor core states 1 through 9. Although the linear heat generation rate at pitch level of LPRM-A in reactor core states 3 through 6, calculated by this incore monitoring method, is a little overestimated, the accuracy comes better by compensating in accordance with control rods position as mentioned in the fourth example.

Figure 13:
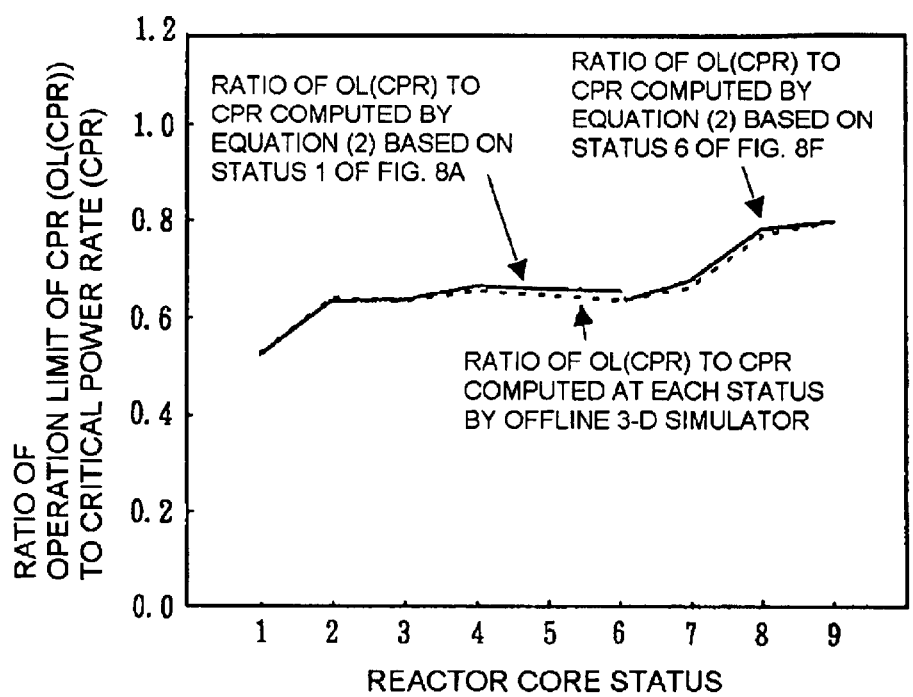
FIG. 13 is a graph schematically showing relation between a ratio of an operation limit of a critical power ratio to a critical power ratio and a reactor core status for explaining characteristics of an embodiment of the invention.

Correspondingly, FIG. 13 shows the transition of the minimum critical power ratios of four fuel assemblies adjacent to the detector assembly number 23 shown in FIG. 1. FIG. 13 shows a ratio of operation limit of the critical power ratio to the calculated critical power ratio, instead of showing the critical power ratio as such. Here, a solid line designates a ratio acquired by the critical power ratio calculated by the incore monitoring method in this invention, and a dotted line designates a result of the actual power distribution calculated by the three-dimensional reactor core simulator.

Here, the calculation of the critical power ratio by this incore monitoring method in this invention is based on equation (2), LPRM-A through LPRM-D have the same weights in a weighted average of values indicated by the LPRM detectors, and compensation of change of the critical power due to a change of the reactor core flow rate is carried out according to the correlation shown in FIG. 5. As shown in FIG. 13, according to the incore monitoring method of this invention, the critical power ratio can be computed with sufficient accuracy according to a reactor core state.

According to this invention, thermal characteristics at a the time when the power distribution calculation is not performed in operation of control rods or reactor core fuel rate, can be acquired instantly and concisely, and the thermal characteristics can be monitored continuously with high accuracy based on continuously-updated plant data and values indicated by LPRM detectors.

Moreover, fuel soundness can be maintained by suspending automatic operation of the control rods or reactor core flow rate in case of deviating of the thermal characteristics out of the critical limit, and time necessary for starting-up or pattern adjustment can be shortened because the power distribution calculation performed after stopping operation for checking the thermal characteristics in starting-up or adjusting of control rods pattern is not necessary.

What is claimed is:

1. An incore monitoring method of a nuclear reactor, comprising performing the following steps in order:
   (1) measuring neutron flux levels at a plurality of pitch levels corresponding to a plurality of local power range monitor sensors arranged in an axial direction inside a detector assembly installed in the nuclear reactor;
   (2) performing a power distribution calculation using a three-dimensional simulation to obtain a first calculation of thermal characteristics of a fuel assembly group consisting of fuel assemblies adjacent to the corresponding detector assembly, based on values indicated by the plurality of local power range monitor sensors of the corresponding detector assembly at a first time;
   (3) performing during a first cycle at least one of (a) adjusting a reactor core flow rate for regulation reactor power and (b) operating control rods in the reactor core for regulation reactor core power;
   (4) performing during said first cycle and after step (3) a plurality of second calculations of thermal characteristics in which the power distribution calculation is not performed, based on values indicated by the plurality of local power range monitor sensors at second times, subsequent to the first time, and based on the thermal characteristics calculated in the first calculation at the first time;
   (5) monitoring during said first cycle and after steps (3) and (4), the plurality of thermal characteristics calculated during said first cycle in the plurality of second calculations;
   (6) performing during a second cycle at least one of (a) adjusting a reactor core flow rate for regulation reactor power and (b) operating control rods in the reactor core for regulation reactor core power;
   (7) performing during said second cycle and after step (6) said plurality of second calculations of thermal characteristics in which the power distribution calculation is not performed, based on values indicated by the plurality of local power range monitor sensors at third times, subsequent to the first and second times, and based on the thermal characteristics calculated in the first calculation at the first time; and
   (8) monitoring during said second cycle and after steps (6) and (7), the plurality of thermal characteristics calculated during said second cycle in the plurality of second calculations.

2. The method as recited in claim 1, wherein:
   at least one of steps (3) and (6) includes adjusting the reactor core flow rate; and said method further comprises the step of:
   suspending the adjusting of the reactor core flow rate when at least one of the monitored plurality of thermal characteristics calculated in the plurality of second calculations exceeds a limit.

3. The method as recited claim 1, wherein
   at least one of steps (3) and (4) includes operating said control rods in said reactor core, said method further comprising the step of:
   suspending the operating of the control rods when at least one of the plurality of thermal characteristics calculated in the plurality of second calculations exceeds a limit.

4. The method as recited in claim 1, wherein the first calculation and the plurality of second calculations are performed using a plurality of detector assemblies disposed adjacent fuel assemblies, said fuel assemblies being symmetrically disposed about a reactor core of the nuclear reactor so that each one quarter of the reactor core is identical with respect to the number and position of the fuel assemblies, and the plurality of local power range monitor sensors are non-symmetrically disposed adjacent to ones of the fuel assemblies so that each of the one quarter of the reactor core is different with respect to at least the position of the local power range monitor sensors.

5. The method as recited in claim 1, further comprising:
   calculating thermal characteristics of one local power range monitor sensor based on values indicated by local power range monitor sensors being symmetrical to, and at the same pitch level of, the respective local power range monitor sensor in terms of a quarter of the reactor core in rotation or in an axis, provided the respective local power range monitor sensor outputs no signal.

6. The method as recited in claim 1, further comprising:
   calculating thermal characteristics of a faulty local power range monitor sensor based on a mean value of values indicated by local power range monitor sensors being symmetrical to, and at the same pitch level of, positions adjacent to the respective faulty local power range monitor sensor in terms of a quarter of the reactor core in rotation or in an axis.

7. The method as recited in claim 1, wherein the first and plurality of second calculations of thermal characteristics includes a linear heat generation rate, and the method includes monitoring the linear heat generation rate.

8. The method as recited in claim 7, further comprising:
   providing an alert signal when a maximum linear heat generation rate based on the monitored linear heat generation rate exceeds a predetermined limit.

9. The method as recited in claim 7, wherein
   at least one of steps (3) and (4) includes operating said control rods in said reactor core, said method further comprising the step of:

acquiring a function designating a changing rate of the linear heat generation rate corresponding to the plurality of local power range monitor sensors with parameters of a changing rate of values indicated by the respective plurality of local power range monitor sensors and a position status of the control rod, based on values indicated by the plurality of local power range monitor sensors and the linear heat generation rate of the respective plurality of local power range monitor at the first time and second times, respectively, and;

correcting the calculated linear heat generation rate based on the function.

10. The method as recited in claim 7, further comprising:

calculating at least some of the plurality of second calculations of the thermal characteristics at a plurality of pitch levels of the plurality of local power range monitor sensors; and calculating thermal characteristics at a pitch level in which no local power range monitor sensor exists based on the calculated thermal characteristics at the corresponding pitch levels.

11. The method as recited in claim 1, wherein the thermal characteristics includes a critical power ratio, and the method includes:

monitoring the critical power ratio calculated at the second times; and providing an alert signal when a minimum critical power ratio based on the monitored critical power ratio exceeds a predetermined limit.

12. The method as recited in claim 11, wherein at least one of steps (3) and (6) includes adjusting the reactor core flow rate; and said method further comprises the steps of:

acquiring a function showing a correlation of a critical power and the reactor core flow rate based on the critical powers and the reactor core flow rate at the first time and second times; and correcting the calculated critical power ratio based on the function.

13. Incore monitoring equipment of a nuclear reactor, comprising:

a detector assembly configured to be installed in the nuclear reactor, including local power range monitor sensors to measure neutron flux levels at a plurality of pitch levels;

a three-dimensional simulator for calculating a power distribution including a first calculation of thermal characteristics of a fuel assembly group consisting of fuel assemblies adjacent to the corresponding detector assembly, based on values indicated by the plurality of local power range monitor sensors of the corresponding detector assembly at a first time;

a control rod operation unit for operating control rods in a reactor core of the nuclear reactor to regulate reactor power, and for suspending operation of the control rods when the monitoring unit detects the thermal characteristics exceeds a predetermined limit;

a recirculation flow control unit for adjusting a reactor core flow rate to regulate reactor power, and for suspending adjustment of the reactor core flow rate when the monitoring unit detects the thermal characteristics exceeds a predetermined limit;

a calculating unit for performing during a first cycle and after operation of at least one of said control rod operation unit and said recirculation flow control unit, a plurality of second calculations of thermal characteristics in which the power distribution calculation is not performed, based on values indicated by the plurality of local power range monitor sensors at a second time, subsequent to the first time, and based on the first calculated thermal characteristics at the first times;

said calculating unit operative for performing during a second cycle, subsequent to said first cycle, and after operation of at least one of said control rod operation unit and said recirculation flow control unit, said plurality of second calculations of thermal characteristics in which the power distribution calculation is not performed, based on values indicated by the plurality of local power range monitor sensors at a third time, subsequent to the second time, and based on the first calculated thermal characteristics at the first time;

a monitoring unit, operative, after said calculating unit performs said plurality of second calculations during said first cycle, for monitoring said plurality of thermal characteristics calculated during said first cycle; and said monitoring unit operative, after said calculating unit performs said plurality of second calculations during said second cycle, for monitoring said plurality of thermal characteristics calculated during said second cycle.

* * * * *